R. R. VALE.
VEHICLE WHEEL.
APPLICATION FILED JUNE 22, 1920.
1,382,032.
Patented June 21, 1921.
2 SHEETS—SHEET 1.
Fig. 1.
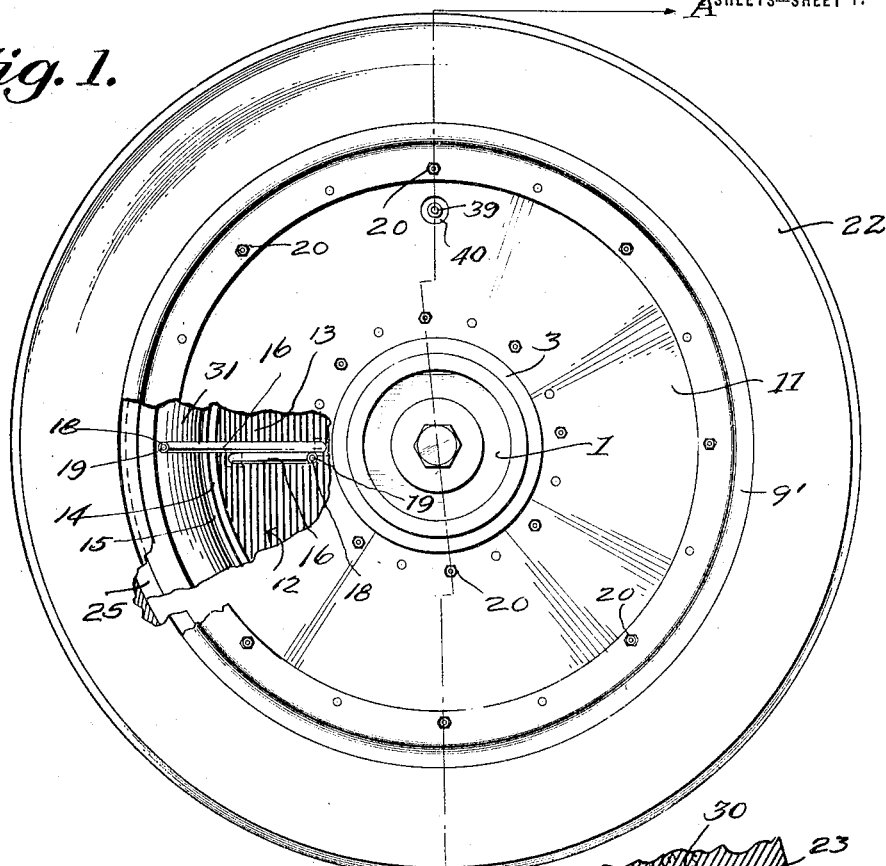
Fig. 3.
Fig. 4.
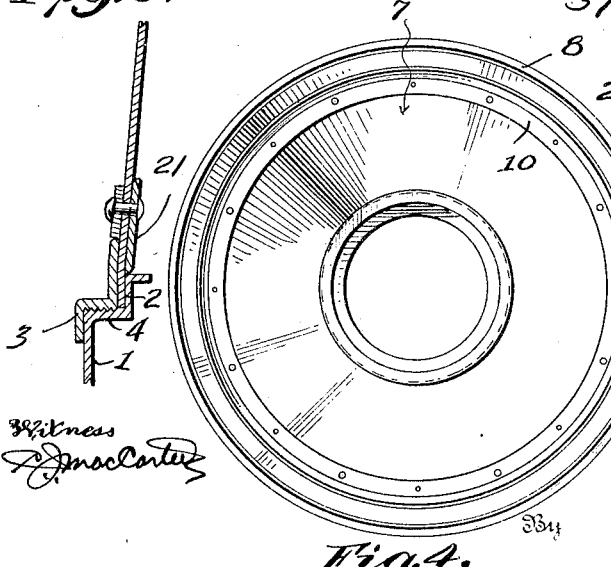
Fig. 5.
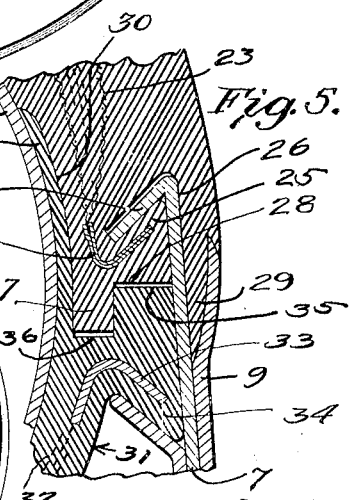
Inventor
Ruby R. Vale
By Josiah M. Vale
Attorney
Witness

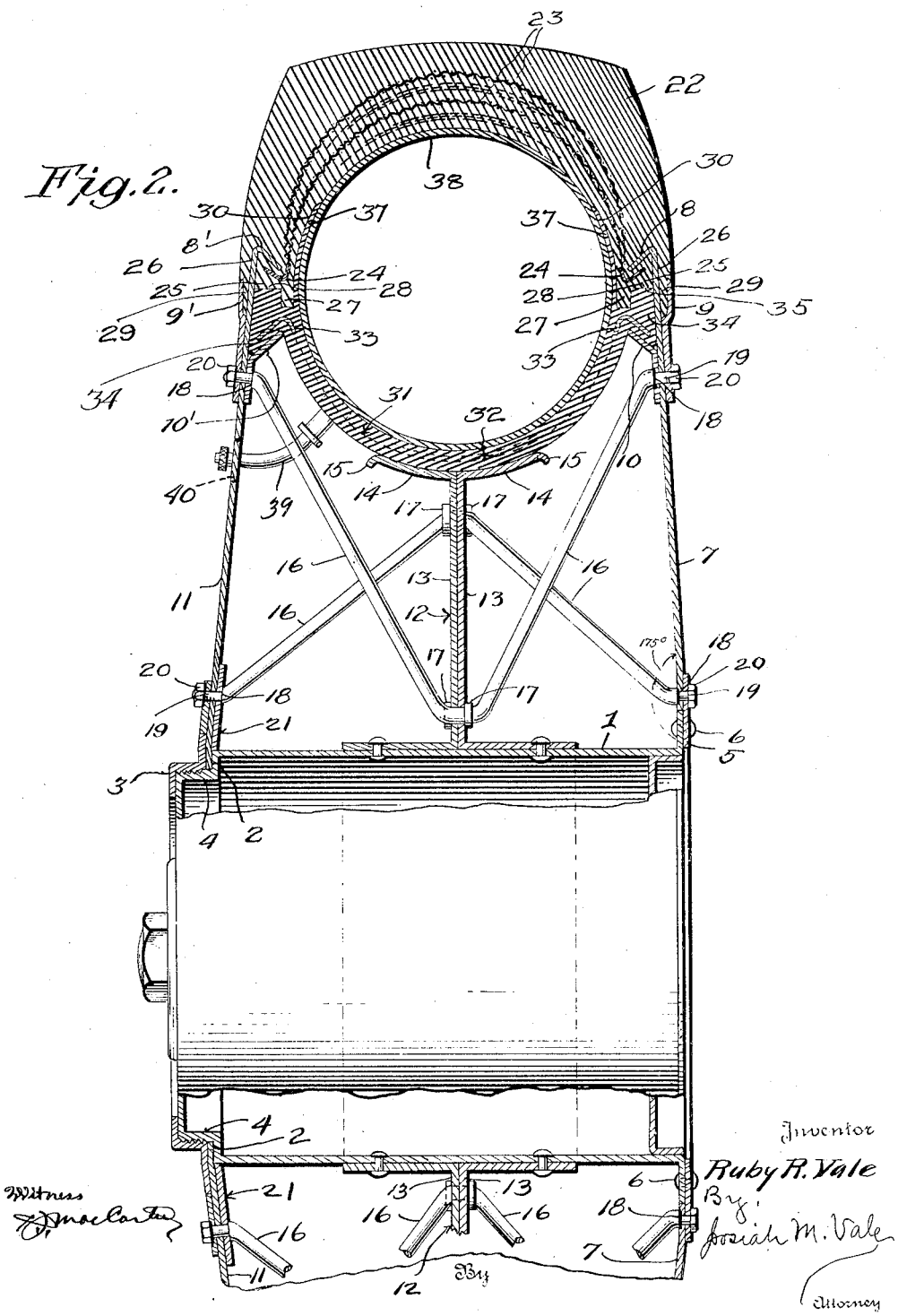

UNITED STATES PATENT OFFICE.

RUBY R. VALE, OF MILFORD, DELAWARE.

VEHICLE-WHEEL.

1,382,032. Specification of Letters Patent. Patented June 21, 1921.

Application filed June 22, 1920. Serial No. 390,794.

*To all whom it may concern:*

Be it known that I, RUBY R. VALE, a citizen of the United States, residing at Milford, in the county of Sussex and State of Delaware, have invented certain new and useful Improvements in Vehicle-Wheels, of which the following is a specification.

My invention relates to improvements in wheel structures and pertains particularly to improvements in wheels and the tires associated therewith.

It is one of the objects of my invention therefore to provide a pneumatic tire which cannot be rim cut and which can easily be made with a tough and thick tread, without interfering in the slightest with the resilient qualities of the tire and which reduces the friction on the inner tube to a minimum, if it does not entirely eliminate it. As is well known, it is the friction between the shoe or casing and the inner tube of the present conventional form of tire that reduces the efficiency thereof. Obviously friction causes wear on the rubbing contacting surfaces and also generates heat which devitalizes the rubber and shortens the life of the casing as well as that of the tube.

It is recognized that a steel wheel is the strongest and probably the cheapest form of wheel that can be constructed, and it has numerous advantages over either the wire wheel or the wooden wheel, inasmuch as it is lighter, can be braced against side strains better and is far easier to clean than either of the other two types of wheels.

The present type of pneumatic tire used on vehicles is exposed to punctures, rim cutting, and blow-outs; and the tread is not replaceable or demountable.

The conventional structure of the casing of the present pneumatic tire is fundamentally wrong in that (*a*) its form is of an arc of a circle rather than of a complete circle, (*b*) its tread and side portions are integral, (*c*) its entire arc is exposed to contact with the irregularities of the surface of the road, and (*d*) its manner of attachment to the rim places the greatest strain of outward pressure of the air chamber and inward pressure of the load at its weakest point. These several defects may be considered in the order of their statement for the purpose of setting forth the objects and advantages of my invention.

(*a*) It is evident that a complete circle gives the maximum of resiliency as well as the most equal distribution of the constant outward pressure of the air chamber, of the inner pressure of the load and of the variable pressure of the side-sway motion.

(*b*) The casing performs two functions, viz. (1) as a tread and buffer between the point of ground contact and the inner tube which carried the load, and (2) as a retainer for the air chamber and restrainer of its constant outward pressure. It is clear that the outer casing in order to perform properly its two functions at one point and at the same point, *e. g.*, the point of ground contact, should consist of two distinct and separate parts, *i. e.*, a tread section which rests upon the inner tube or air chamber and a bottom or cradle section upon which the air tube or chamber rests.

(*c*) Protection from puncture is increased as the arc of the casing exposed to the projections and irregularities of the surface of the road is decreased. The tread alone should be so exposed and the side arcs should be completely protected.

(*d*) The weakest point of the casing of present construction is at its bead. The manner in which the one piece casing, as now constructed, is now attached to the rim of the wheel increases this weakness. This results from the fact that the constant outward pressure of the air chamber and the inward pressure of the load are both at the same time and place, *e. g.*, at the point of ground contact, thrown against the rim or bead and side arcs of such casing, resulting in a destructive hinge-like motion as the side arcs rise and fall with the load. The rim or bead of the tread casing should not be attached to the rim of the wheel, but the tread section should merely rest upon the inner tube and be held in place by attachment to the periphery of the wheel, and a semi-circular bottom or cradle section should be suspended from the periphery of the wheel and rest upon a cradle. This semi-circle will transfer both the outward pressure of the air chamber and the load's inward pressure from the rim or bead of the tread section to the bottom or cradle section of the casing. The wooden, wire, steel, or steel disk wheel, as now constructed, is not adapted to be used in connection with the improved pneumatic tire herein described. This is because the improved casing is a complete circle consisting of two separate semi-circular sections, each attached to the periphery of the wheel and making necessary an open space in which may be placed the inner or cradle section of the casing.

It is a further object of my invention to provide an improved metallic wheel which is strong and rigid, yet light in weight, braced against side-sway, and which is peculiarly adapted to coöperate with my improved pneumatic tire to the end that a compact, unified and coöperating structure may result.

The elimination of rim cutting is achieved by forming the tire of two distinct but interengaged sections, and fastening the sections to the wheel at the sides of the sections instead of at the inner periphery of the tire as in the present conventional form.

It is a further object of my invention to produce a two-part tire of such construction that the outer section or tread section or part may be removed for changing the inner tube without disturbing the other or cradle section of the tire.

A further object of my invention is to provide a puncture proof tire which has a minimum weight as compared with the present conventional tire. For this purpose I provide a thickened outer or tread section with reinforcing puncture proof metallic elements, and an inner section of light weight material of substantially a semicircle in cross section to which the outer or tread section is fastened.

In connection with wheel structures it may be noted that the conventional form of wheel with spokes, whether wire, steel or wood, is difficult to clean, and has the further disadvantage of time and labor consumed in setting the felly on the spokes and truing the finished wheel. Hence it is a further object of my invention to eliminate the felly and spokes by providing a pair of steel plates or disks on the hub, as the equivalent of the spokes without the disadvantages thereof, and a cradle rising perpendicularly from the hub and terminating at its outer periphery in a tire receiving portion which thus performs the functions of a felly.

In carrying out my invention I provide a built up hub, inner and outer plates, mounted on the hub, and a cradle or standard rising perpendicularly from the hub, a two part tire, comprising a tread section and a bottom or cradle section, the cradle section, resting on the cradle or standard for vertical support, retaining means on the side walls for holding the two parts of the tire at the sides.

My invention consists in further details of construction of the foregoing elements which obviously might be subject to many changes, without departing from the spirit and scope of my invention.

In the accompanying drawings, forming part of the specification:

Figure 1 is a side elevation of a complete wheel and tire, partially broken away to show the lateral braces of the wheel, Fig. 2 is a vertical section on line A—A of Fig. 1 through a portion of the tire and wheel, partially broken away and showing the relation of the different elements, Figs. 3, 4 and 5 are details of construction.

The hub of the wheel which is made in any preferred form, according to requirements, has an annular drum 1, and an annular shoulder 2 formed thereon toward the outer side of the wheel, and a flanged retaining ring 3, screwed to a constricted part 4 of the drum 1.

The inner side of the hub has a retaining ring 5 fastened to it, by rivets 6, and the outer part of the ring is adapted to receive and hold the inner edge of the disk or plate 7, by stays to be described later.

The plate 7 is slightly dished so as to incline toward the center of the hub at the outer edge as indicated by the symbol of the angle just above the retaining ring 5 in Fig. 1. The angle 175°— is approximate and is of course subject to variations, or the disk or plate may be plane or flat. The outer edge of the disk or plate 7 terminates in a hook or acute angle flange 8, and back from the edge and rigidly fastened by rivets and other means to be described later are the dust excluding clencher ring 9, and on the inside, the obtuse angled flanged ring 10.

The removable plate or disk 11 is similarly formed with a hook or acute angled flange 8'; dust excluding clencher ring 9' and obtuse angled flange ring 10'; all riveted together and plate 11 is also dished in the same manner as plate 7. This plate is to be removed for changing the tire and is held at its inner end against the shoulder 2 on the drum 1 by the flanged retaining ring 3.

Extending radially from the hub 1, and bolted thereto at the bottom is the standard or cradle 12, comprising preferably two similar flanged elements 13, placed back to back, and at their outer ends forming a cradle to support a portion of the tire. It is to be noted that the outer surface 14 thus formed is curved to fit the inner surface of the tire, and that the ends of the flanges are curved toward the hub as at 15 to allow for distention of the tire and without danger of cutting.

The standard is rigidly affixed to the drum 1 of the hub as noted, and the plates or disks 7 and 11 are stayed and reinforced against side strain by the stays 16 arranged in staggered relation about the cradle and between the cradle and the inner and outer edges of the plates or disks.

The stays comprise curved rods as shown, with heads 17 to engage the cradle, at one end and at the other end terminating in a shoulder 18 and a reduced threaded spindle 19, carrying the nut 20 thereon.

The plate 7 and retaining ring 5 have registering openings through which the spindle 19 of the stay passes, and the retaining ring 5 and plate 7 are locked together between the shoulder 18 and the nut 20.

In order that but one size of stay need be used which will make them interchangeable, obviously of importance from a commercial standpoint, I may provide a spacer ring 21, abutting against the flanged retaining ring 3 on the removable plate 11, which provides two thicknesses of material between the shoulder 18 and nut 20 and reinforces the construction. This spacer ring 21 serves another purpose when the plate 11 is to be removed and replaced later, inasmuch as it serves to keep the spindles 19 of the stays 16 in their proper spaced relation in order that the plate 11 may be put on without undue delay or trouble, and the ends of the stays will pass directly through the appropriate openings in the plate.

At the outer edge of the plates or disks 7 and 11, the disks, and both rings have registering openings through which the spindles 19 pass and the rings and disks are held rigidly together between the shoulders 18 and nuts 20.

The pneumatic tire consists of an inner tube or air chamber of usual construction and of an outer casing forming a complete circle, and is composed of two sections, an outer or tread section and an inner or cradle section.

The outer section 22 has a thick tread and may be reinforced in any preferred manner, as by woven metal fabric 23 terminating in metallic rings 24 extending laterally to reinforce and strengthen a clencher element 25 formed by a peripheral slot 26 in the ends of the side walls of the outer section. The slots 26 are formed to receive the hooks or acute angle flanges 8 and 8' and to leave a little space for movement when the tire is in use upon a road. The side walls of the outer section terminate in annular tenons 27, flat faces 28, and depending flanges 29. The inner sides of the walls are cut away slightly as at 30.

The inner section 31 of the tire may be made of elements different in texture, material and strength from the outer section as it does not come in contact with nor receive the impact of the road. I preferably reinforce this section by a woven metal reinforcement 32 terminating in metal hooks 33 embedded in annular flanges 34.

The side walls of the inner section terminate in flat faces 35, peripheral grooves 36, and flaps 37.

In its assembled position the two sections of the tire are jointed at the termination of their respective side walls, and are held and locked against undesired movement by the hooks 8 and 8' being received in the slots 26.

The depending flanges 29 are received by the dust excluding clencher rings 9, the annular tenons 27 fit into the peripheral grooves 36 of the inner section while the flaps 37 enter the cut away portions 30 of the outer section to form a seal between the two sections against which the inner tube 38 expands.

The valve stem 39 of the inner tube 38 may be brought out of the wheel at any preferred point, as through opening 40 in the removable disk 11.

I preferably construct the two tire sections so that in their engaged position there is a little space left between the contacting surfaces, to the end that as the tire runs against the road there may be a little movement vertically between the two sections as illustrated by Fig. 5.

As vertical or load pressure is brought to bear against the tread section, there is sufficient resilience in the element to transmit the pressure to the inner tube and then vertically against the cradle section 31 of the tire, which in fact carries the load.

It will be noted that this inner or cradle section is suspended from the sides of the steel disk plates and rests upon the standard of cradle 12, and that the load is supported directly in the center of the inner or cradle section and it is thus impossible for expansion to take place directly against this cradle. There is a space, however, between the curved ends 15 of the flanges 14 of the cradle, and the obtuse angled flange rings 10 and 10' in which distention of the inner section of the tire is permitted.

I claim as my invention:

1. The combination with a wheel formed of side plates and a hub, of a cradle mounted on the hub, an air chamber and a two-part casing, comprising inner and outer sections connected to the side plates, one section of said tire being supported on said cradle for vertical support.

2. The combination with a wheel formed of side plates and a hub, of a cradle mounted on the hub, an air chamber and a two-part casing, comprising inner and outer sections connected to the side plates, one section of said tire being supported on said cradle for vertical support, the relation between the cradle and the side plates being such that spaces are left therebetween to permit distention of the inner section of said casing.

3. A two part tire comprising a tread and a cradle section, means on each section to permit interlocking engagement of the two sections, and a wheel composed of a hub, side plates and a cradle connected to the hub, means on the side plates to engage and hold the two interlocking sections of the tire and to hold each section in its proper position, said inner section adapted to be supported vertically on said cradle.

4. In a vehicle wheel, the combination with a pneumatic inner tube and a cradle, of a casing consisting of two separate parts, one of said parts lying between the cradle and the pneumatic inner tube and the other part being superimposed upon the pneumatic inner tube to form a tread, and flanged retaining means attached to said parts and to the rim of the wheel to hold said casing in place on the wheel.

5. In a vehicle wheel separate disks resting upon the drum of the hub and attached at either end thereto at acute angles with inwardly turned periphery engaging with the flange of the separate tread member of the outer section of the casing and a projection on the inner side of each disk engaging under the downward turned flanges of the separate suspended cradle section of the casing resting upon a support attached to the center of the hub drum and with reciprocal stays extending from the periphery of the support to the base of the disk, and from the base of the support to the periphery of the disk and with a pneumatic tube between the tread and the cradle sections.

6. A two part casing comprising a tread and a cradle section, means on each section to permit interlocking engagement of the two sections, and a wheel composed of a hub, side plates and a cradle connected to the hub, means on the side plates to engage and hold the two interlocking sections of the casing and to hold each section in its proper position, said inner section adapted to be supported vertically on said cradle; means connecting the side plates and said cradle to reinforce said wheel against side strains.

7. In a vehicle wheel a slotted casing, a hook member adapted to be received in said slot to hold said casing, a second casing having an interlocking engagement with the first mentioned casing, and means detachably secured to said hook member for holding the two casings in such interlocked engagement.

8. In a wheel the combination with a hub, of side plates connected to said hub, means on said plates to hold a tire, and a cradle section mounted on said hub and adapted to receive and hold a tire against vertical movement so constructed that a felly and spokes are eliminated.

9. A two part tire comprising a tread and a cradle section, means on each section to permit interlocking engagement of the two sections, and a wheel composed of a hub, side plates and a cradle connected to the hub, means on the side plates to engage and hold the two interlocking sections of the tire and to hold each section in its proper position, said inner section adapted to be supported vertically on said cradle, one of said plates being removable.

10. A two part casing comprising a tread and a cradle section, means on each section to permit interlocking engagement of the two sections, an inner tube between the two sections, a wheel associated therewith having a perpendicular cradle adapted to support the cradle section of the tire, the whole being so constructed that the tread section is supported on the inner tube and the cradle section is supported on the cradle instead of on a felly.

11. The combination of a wheel comprising a hub, side plates and a cradle, an air chamber, a two section casing, one section of which rests on the cradle, the other having slots in its side walls and means on the side plates for engaging in said slots for holding said outer section.

12. The combination of a wheel comprising a hub, side plates and a cradle, an air chamber, a two section casing, one section of which rests on the cradle, the other having slots in its side walls and means on the side plates for engaging in said slots for holding said outer section, additional means on the plates for holding the inner section of the tire.

13. The combination of a wheel comprising a hub, side plates and a cradle, an air chamber, a two section casing, one section of which rests on the cradle, the other having slots in its side walls and means on the side plates for engaging in said slots for holding said outer section, said means comprising acute angled flanged hooks integral with said plates.

14. The combination of a wheel comprising a hub, side plates and a cradle, an air chamber, a two section casing, one section of which rests on the cradle, the other having slots in its side walls and means on the side plates for engaging in said slots for holding said outer section, said means comprising acute angled flanged hooks integral with said plates, and an obtuse angled flanged ring fastened to the plates for holding the inner section of said tire.

15. The combination of a wheel comprising a hub, side plates and a cradle, an air chamber, a two section casing, one section of which rests on the cradle, the other having slots in its side walls and means on the side plates for engaging in said slots for holding said outer section, said means comprising acute angled flanged hooks integral with said plates, an obtuse angled flanged ring fastened to the plates for holding the inner section of said tire, and a dust excluding clencher ring fastened to the plates and engaging and binding a depending portion of the side walls of said outer section.

16. In a wheel structure the combination with a hub, of side plates affixed to the hub and a cradle, said cradle comprising two annular flanged elements fastened back to back one flange of each element being fastened to the hub and the other flange of each element forming a supporting surface for a tire.

17. The combination with a wheel and a cradle thereon, of a two section tire comprising an outer tread section, and an inner cradle supported section, and means engaging both sections at substantially diametrically opposite points for securing said sections to each other and to the wheel.

In testimony whereof I hereto affix my signature.

RUBY R. VALE.